(12) United States Patent
Takahashi et al.

(10) Patent No.: US 9,841,356 B2
(45) Date of Patent: Dec. 12, 2017

(54) COMBUSTION PRESSURE SENSOR (71) Applicants: CITIZEN FINETECH MIYOTA CO., LTD., Kitasaku-gun, Nagano (JP); CITIZEN HOLDINGS CO., LTD., Nishitokyo-shi, Tokyo (JP)

(72) Inventors: Kazuo Takahashi, Nagano (JP); Takayuki Hayashi, Nagano (JP)

(73) Assignees: CITIZEN FINEDEVICE CO., LTD., Minamitsuru-Gun, Yamanashi (JP); CITIZEN WATCH CO., LTD., Nishitokyo-Shi, Tokyo (JP)

( * ) Notice: Subject to any disclaimer, the term of this patent is extended or adjusted under 35 U.S.C. 154(b) by 281 days.

(21) Appl. No.: 14/424,502

(22) PCT Filed: Aug. 27, 2013

(86) PCT No.: PCT/JP2013/072814
§ 371 (c)(1),
(2) Date: Feb. 27, 2015

(87) PCT Pub. No.: WO2014/034640
PCT Pub. Date: Mar. 6, 2014

(65) Prior Publication Data
US 2015/0226641 A1 Aug. 13, 2015

(30) Foreign Application Priority Data
Aug. 29, 2012 (JP) .................. 2012-188421

(51) Int. Cl.
*G01M 15/08* (2006.01)
*G01L 23/08* (2006.01)
*G01L 23/26* (2006.01)

(52) U.S. Cl.
CPC ............ *G01M 15/08* (2013.01); *G01L 23/08* (2013.01); *G01L 23/26* (2013.01)

(58) Field of Classification Search
CPC .................................................. G01M 15/08
(Continued)

(56) References Cited

U.S. PATENT DOCUMENTS 3,566,163 A * 2/1971 Fischer .................... G01L 1/16
310/329
3,857,287 A * 12/1974 Sonderegger ........... G01L 23/10
310/338
(Continued)

FOREIGN PATENT DOCUMENTS

| JP | 63-070689 U | 5/1988 |
|----|-------------|--------|
| JP | 4-034327 A  | 2/1992 |

(Continued)

OTHER PUBLICATIONS

International Search Report issued in PCT/JP2013/072814, dated Oct. 15, 2013.

*Primary Examiner* — Peter Macchiarolo
*Assistant Examiner* — Alexander Mercado
(74) *Attorney, Agent, or Firm* — Birch, Stewart, Kolasch & Birch, LLP (57) ABSTRACT

A combustion pressure sensor is formed of a ring-shaped cylindrical body. The combustion pressure sensor detects combustion pressure in a combustion chamber of an engine by being attached to an outer periphery of a tip of a functional component attached to the combustion chamber. The cylindrical body forms sealed space sealed with a ring-shaped diaphragm on one side and with a ring-shaped support member on an opposite side. The sealed space is defined by an external cylindrical member and an internal cylindrical member coaxial with each other. The diaphragm has a ring-shaped pressure receiving part formed on a side near the combustion chamber to receive pressure from outside and a ring-shaped transmitting part formed on a rear surface of the diaphragm. A pressure transmitting member (Continued)

and a pressure detecting element are provided in the sealed space. Tight abutting contact is formed between the transmitting part of the diaphragm and the pressure transmitting member, between the pressure transmitting member and the pressure detecting element, and between the pressure detecting element and the support member.

20 Claims, 5 Drawing Sheets

(58) Field of Classification Search
USPC .................................................. 73/114.18
See application file for complete search history.

(56) References Cited

U.S. PATENT DOCUMENTS

| | | | | |
|---|---|---|---|---|
| 4,056,009 | A * | 11/1977 | Sonderegger | F16J 3/02 338/4 |
| 4,061,035 | A * | 12/1977 | Witzke | F16J 3/02 73/715 |
| 4,136,560 | A * | 1/1979 | Gellos | B60C 23/0496 73/146.8 |
| 4,169,388 | A * | 10/1979 | Teitelbaum | G01L 23/22 73/114.21 |
| 4,984,905 | A * | 1/1991 | Amano | G01K 7/04 340/438 |
| 5,483,835 | A * | 1/1996 | Ciolli | G01L 9/0057 73/725 |
| 5,488,868 | A | 2/1996 | Ootake et al. | |
| 5,503,023 | A * | 4/1996 | Benedikt | F02D 35/023 73/114.18 |
| 5,750,899 | A * | 5/1998 | Hegner | G01L 19/14 73/706 |
| 6,131,465 | A * | 10/2000 | Wlodarczyk | G01L 9/0077 73/35.01 |
| 2001/0008090 | A1 * | 7/2001 | Murai | G01L 23/10 73/756 |
| 2002/0195917 | A1 * | 12/2002 | Hiramatsu | H01T 21/02 313/144 |
| 2004/0261502 | A1 * | 12/2004 | Watarai | F02B 77/08 73/35.13 |
| 2006/0053875 | A1 | 3/2006 | Haussner et al. | |
| 2006/0059983 | A1 * | 3/2006 | Maldonado | B60C 23/0496 73/146 |
| 2007/0039592 | A1 * | 2/2007 | Kull | F02M 61/14 123/470 |
| 2008/0127742 | A1 * | 6/2008 | Mueller | G01L 19/0015 73/756 |
| 2008/0148807 | A1 * | 6/2008 | Berry | G01L 19/143 73/1.57 |
| 2009/0041081 | A1 * | 2/2009 | Warth | G01L 19/0092 374/143 |
| 2010/0050991 | A1 * | 3/2010 | Cooke | F02M 51/005 123/470 |
| 2011/0005308 | A1 * | 1/2011 | Kern | F23Q 7/001 73/114.16 |
| 2011/0113889 | A1 * | 5/2011 | Funken | F16J 3/02 73/715 |
| 2012/0174660 | A1 * | 7/2012 | Doering | G01L 19/0681 73/114.16 |
| 2015/0027213 | A1 * | 1/2015 | Maier-Schleich | G01L 19/0645 73/114.18 |
| 2015/0135811 | A1 * | 5/2015 | Wolff | F23Q 7/001 73/114.18 |
| 2016/0025580 | A1 * | 1/2016 | Ooya | G01L 19/0681 73/702 |
| 2016/0076971 | A1 * | 3/2016 | Hirokawa | F23Q 7/001 73/114.18 |
| 2016/0153861 | A1 * | 6/2016 | Doering | G01L 19/0645 73/114.19 |
| 2016/0245721 | A1 * | 8/2016 | Brunner | G01D 11/245 |

FOREIGN PATENT DOCUMENTS

| | | | |
|---|---|---|---|
| JP | 7-019981 A | 1/1995 | |
| JP | H087105 B2 * | 1/1996 | |
| JP | 2006-084468 A | 3/2006 | |
| JP | 2009-536995 A | 10/2009 | |
| JP | 2011-022071 A | 2/2011 | |
| WO | WO 2009016030 A1 * | 2/2009 | ............... G01L 1/16 |

* cited by examiner

COMBUSTION PRESSURE SENSOR

TECHNICAL FIELD

This invention relates to a combustion pressure sensor that measures pressure in a combustion chamber of an engine, particularly relates to a combustion pressure sensor that detects combustion pressure in a combustion chamber of an engine by being attached to an outer periphery of a tip of a functional component attached to the combustion chamber such as a spark plug or an injector.

BACKGROUND ART

In response to a recent trend toward higher performance of an engine, many combustion pressure sensors for detection of combustion pressure in a combustion chamber have been suggested with the intention of controlling a combustion state in the combustion chamber precisely.

There has been a suggested pressure-measuring glow plug used for a diesel engine in which a conventional combustion pressure sensor is provided. The pressure-measuring glow plug includes a cylindrical plug body that can be fitted in a cylinder of a diesel engine, a heating rod housing a heat generator that generates heat in response to conduction of a current, the combustion pressure sensor that outputs an electric signal in response to the load of the heating rod moving under pressure in the cylinder, and others. The heating rod is rigidly connected mechanically to the combustion pressure sensor and a bellows. The bellows is arranged as a sealing element between the heating rod and the plug body. The bellows elastically supports the heating rod 51 in the axial direction in the plug body to allow the heating rod 51 to allow friction-free movement thereof (see patent literature 1, for example).

There has been a suggested combustion pressure sensor according to a different background art functioning as a high-temperature pressure sensor. In this sensor, if the pressure of a high-temperature fluid acts on a measurement target pressure reaction surface of a diaphragm, the diaphragm deflects. This deflection is transmitted through a pressure transmitting member to a strain sensitive element. The strain sensitive element outputs an electric signal responsive to received pressure. A central part of the diaphragm is depressed to a side opposite the high-temperature fluid. This achieves favorable measurement accuracy without causing an output error due to heat (see patent literature 2, for example).

There has been a suggested combustion pressure sensor according to a different background art provided in a spark plug. The spark plug has an insulator formed around a center electrode, and a washer member electrically connected to a lateral electrode and formed around the insulator. The combustion pressure sensor includes a piezoelectric element made of lithium niobate and arranged between the insulator and the washer member and near a spark gap between the center electrode and the lateral electrode (see patent literature 3, for example).

PRIOR ART LITERATURES

Patent Literatures

JP-No. 2006-84468
JP-No. H7(1995)-19981
JP-No. H4(1992)-34327

DISCLOSURE OF INVENTION

Problem to be Solved by Invention

In the conventional combustion pressure sensor shown in patent literature 1, the bellows holds the heating rod to detect combustion pressure. Thus, a combustion residue in an engine combustion chamber adheres to the valley of the bellows and is accumulated therein. This impairs the function of the bellows and eventually hinders expansion and contraction of the bellows, disabling detection of combustion pressure.

The conventional combustion pressure sensor shown in patent literature 2 is not attached to a spark plug or an injector as a functional component but it is a single-function sensor intended for measurement of combustion pressure only. Thus, this sensor should be attached independently by adding a through hole in a given position of an engine combustion chamber and maintaining a structure of high airtightness. Additionally, this sensor is composed of a single pressure detecting element and does not allow provision of multiple pressure detecting elements that might achieve higher sensitivity.

In the conventional combustion pressure sensor shown in patent literature 3, a pressure detecting element for detection of combustion pressure in an engine has a narrow ring shape made of a single-crystalline material. This makes manufacture difficult to cause a problem relating to performance of mass production in terms of high processing skill required to form the pressure detecting element by cutting, for example. Additionally, while being joined to a diaphragm, the pressure detecting element is made open and is not supported by a rigid body on an opposite side. This makes it difficult to convert combustion pressure received by the diaphragm to an electric signal correctly and efficiently.

This invention is intended to provide a combustion pressure sensor solving the aforementioned problems of the background arts, particularly a combustion pressure sensor formed of a ring-shaped cylindrical body that can be attached to a tip of a functional component of an engine, insusceptible to adhesion of a combustion residue, achieving favorable measurement accuracy irrespective of exposure to a high-temperature fluid, and achieving high sensitivity.

Means of Solving Problem

To solve the aforementioned problems, a combustion pressure sensor according to this invention is formed of a ring-shaped cylindrical body. The combustion pressure sensor detects combustion pressure in a combustion chamber of an engine by being attached to an outer periphery of a tip of a functional component attached to the combustion chamber. The cylindrical body forms sealed space sealed with a ring-shaped diaphragm on one side and with a ring-shaped support member on an opposite side. The sealed space is defined by an external cylindrical member and an internal cylindrical member coaxial with each other. The diaphragm has a ring-shaped pressure receiving part formed on a side near the combustion chamber to receive pressure from outside and a ring-shaped transmitting part formed on a rear surface of the diaphragm. Tight abutting contact is formed between the transmitting part of the diaphragm and the pressure transmitting member, between the pressure transmitting member and the pressure detecting element, and between the pressure detecting element and the support member.

In this case, according to a preferred aspect of this invention, the transmitting part and the pressure receiving part are formed integrally, a ring thickness is smaller at the transmitting part than at the pressure receiving part, and the transmitting part is provided in a central part of a thickness direction of the pressure receiving part, thereby forming a T-shape cross section. In this case, it is desirable that the transmitting part be formed so as to become smaller gradually in the ring thickness from a side near the pressure transmitting member toward a side near the pressure receiving part, and that the pressure receiving part is formed so as to become smaller gradually in a ring width from opposite sides toward the center in a thickness direction thereof. The opposite sides of the pressure receiving part in the thickness direction can be fixed to an end portion of the external cylindrical member and an end portion of the internal cylindrical member. The pressure receiving part can have a flat pressure receiving surface. Meanwhile, the pressure receiving part can have a flat pressure receiving surface and a groove can be formed in a central part of the pressure receiving surface in a thickness direction thereof so as to extend along an entire circumference. An electrode support member can be provided between the pressure transmitting member and the pressure detecting element and the electrode support member can be provided with multiple piezoelectric detecting elements. The electrode support member can be an electrode layer formed on a surface of the pressure transmitting member. The pressure detecting element can be formed as a rectangular parallelepiped and the pressure detecting elements can be arranged at an interval in a circumferential direction of the sealed space. In this case, a spacer can be arranged in the interval between the pressure detecting elements.

Advantageous Effects of Invention

The combustion pressure sensor of this invention having the aforementioned structure achieves the following remarkable effects.

(1) The combustion pressure sensor is formed into a ring-shaped cylindrical body that can be attached to a tip portion of a functional component in an engine combustion chamber. Thus, combustion pressure is measured directly in the engine combustion chamber without forming an additional through hole in the combustion chamber. This allows accurate measurement of combustion pressure. Further, the diaphragm forms the ring-shaped pressure receiving part for combustion pressure. Thus, adhesion of a combustion residue on a surface of the diaphragm causes no effect on the rigidity of the diaphragm to allow accurate measurement of combustion pressure.

(2) According to a preferred aspect, the transmitting part and the pressure receiving part are formed integrally, the ring thickness is smaller at the transmitting part than at the pressure receiving part, and the transmitting part is provided in the central part of the thickness direction of the pressure receiving part, thereby forming a T-shape cross section. This allows transmission of a maximum displacement amount to the transmitting part in response to receipt of pressure by the pressure receiving part. As a result, detection sensitivity, detection accuracy, and detection efficiency can be enhanced.

(3) According to a preferred aspect, the transmitting part is formed so as to become smaller gradually in the ring thickness from a side near the pressure transmitting member toward a side near the pressure receiving part. This can increase an area of contact of the transmitting part with the pressure transmitting member relatively, thereby achieving a stable and highly-reliable transmission function.

(4) According to a preferred aspect, the pressure receiving part is formed so as to become smaller gradually in the ring width from the opposite sides toward the center in the thickness direction thereof. This can ensure detection sensitivity while ensuring attachment strength (mechanical strength), thereby forming a favorable diaphragm (pressure receiving part) that is well balanced in terms of strength and sensitivity.

(5) According to a preferred embodiment, the pressure receiving part has the flat pressure receiving surface and the groove is formed in the central part of the pressure receiving surface in the thickness direction thereof so as to extend along an entire circumference. Even if the diaphragm is exposed to a high-temperature fluid resulting from combustion in the combustion chamber, the groove formed in the central part of the diaphragm avoids the occurrence of an output error due to heat. This allows accurate measurement of combustion pressure, making it possible to provide a combustion pressure sensor achieving favorable measurement accuracy.

(6) According to a preferred embodiment, the electrode support member is provided between the pressure transmitting member and the pressure detecting element and the electrode support member is provided with the multiple piezoelectric detecting elements. This allows provision of the multiple piezoelectric detecting elements to the electrode support member, so that combustion pressure can be detected at enhanced sensitivity.

(7) According to a preferred embodiment, the electrode support member is the electrode layer formed on a surface of the pressure transmitting member. This makes the pressure transmitting member and the pressure detecting element abut on each other directly. Thus, loss in pressure transmission is eliminated, so that detection sensitivity can be enhanced further.

(8) According to a preferred embodiment, the pressure detecting element is formed as a rectangular parallelepiped and the pressure detecting elements are arranged at the interval in the circumferential direction of the sealed space. Even if the pressure detecting elements are made of a hard-to-process single-crystalline material of excellent resistance to heat, the easily processable shape thereof as a rectangular parallelepiped allows multiple pressure detecting elements to be arranged at the interval on the circumference of the electrode support member. This contributes to increase in a yield, enhancement in the performance of mass production, and cost reduction. This also makes the occurrence of a trouble unlikely such as a fracture, thereby contributing to enhancement in reliability.

(9) According to a preferred embodiment, the spacer is arranged in the interval between the pressure detecting elements. This allows the spacer and the pressure detecting elements to be arranged tightly along the entire circumference of the sealed space, thereby facilitating assembly correctly.

REFERENCE SIGNS LIST

1: Combustion pressure sensor, 2: Combustion pressure sensor, 11: Support member, 12: External cylindrical member, 13: Internal cylindrical member, 14a: Diaphragm, 14b: Diaphragm, 15: Pressure transmitting member, 16: Pressure detecting element, 17: Spacer, 18a: Electrode layer, 18b: Electrode member, 19: Sealed space, 20: Connection terminal, 111: Ground terminal, 140: Groove, 141: Pressure receiving part, 142: Transmitting part, 181: Insulating part, 182: Electrode, 201: Tip, Ec: Combustion chamber

BEST MODES FOR CARRYING OUT INVENTION

The following describes preferred embodiments of this invention in detail based on the drawings.

Combustion pressure sensors in the embodiments described below are shown to be attached to an injector as a functional component of an engine, for example.

First Embodiment

Figure 1:
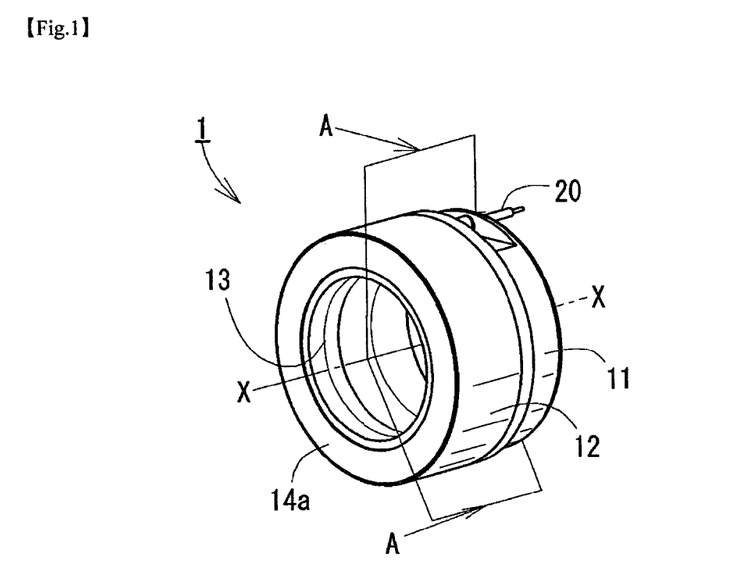
FIG. 1 is a perspective view showing the appearance of a combustion pressure sensor according to a first embodiment of this invention.
Figure 2:
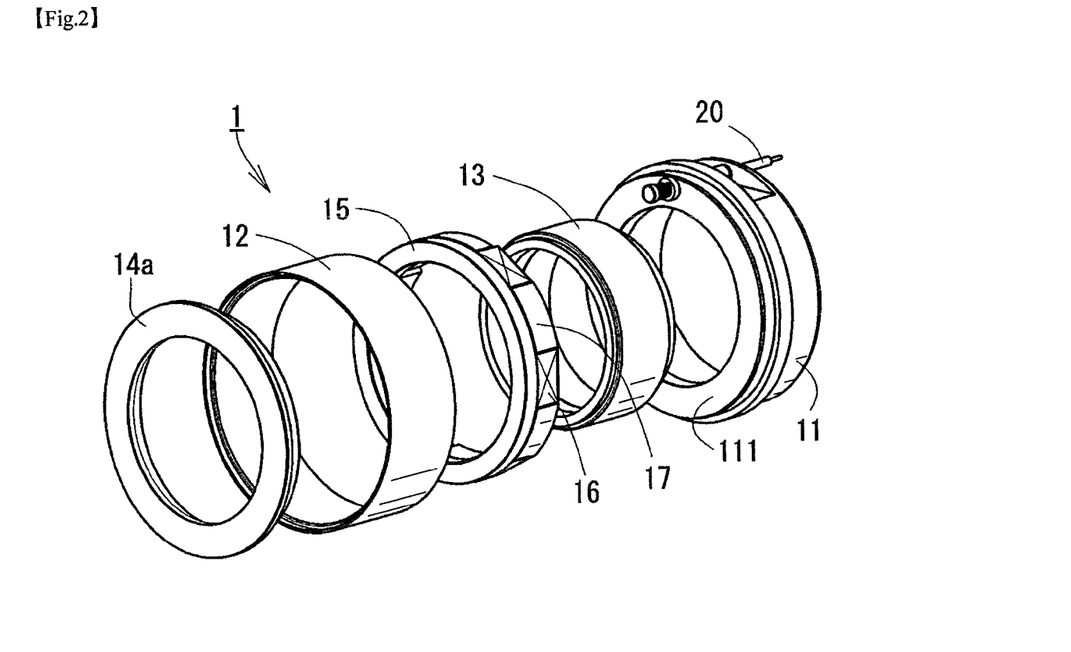
FIG. 2 is an exploded perspective view illustrating the structure of the combustion pressure sensor according to the first embodiment of this invention.
Figure 3:
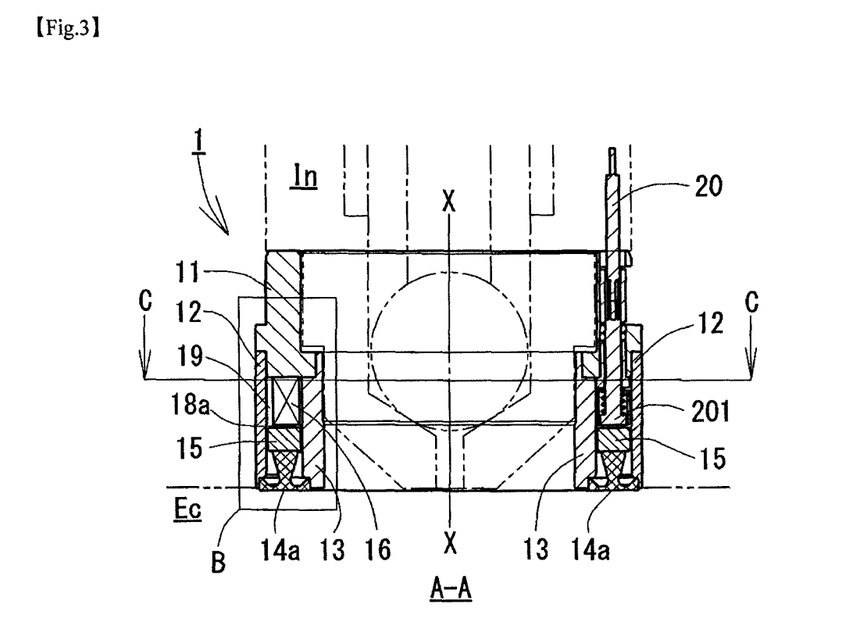
FIG. 3 is a sectional view taken along A-A of FIG. 1 illustrating the structure of the combustion pressure sensor according to the first embodiment of this invention.
Figure 4:
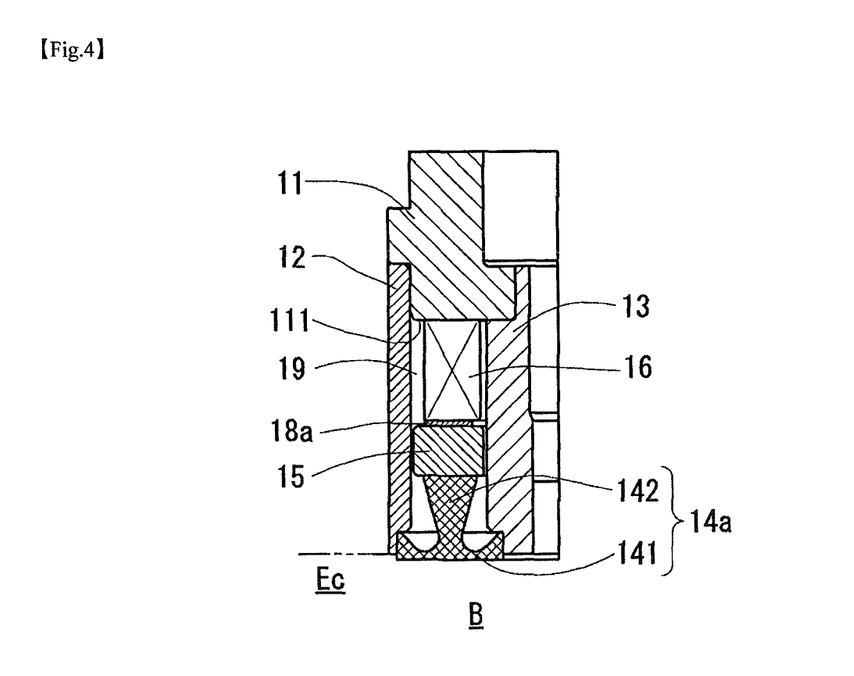
FIG. 4 is a partial sectional view showing a part B of FIG. 3 in an enlarged manner belonging to the combustion pressure sensor according to the first embodiment of this invention.
Figure 5:
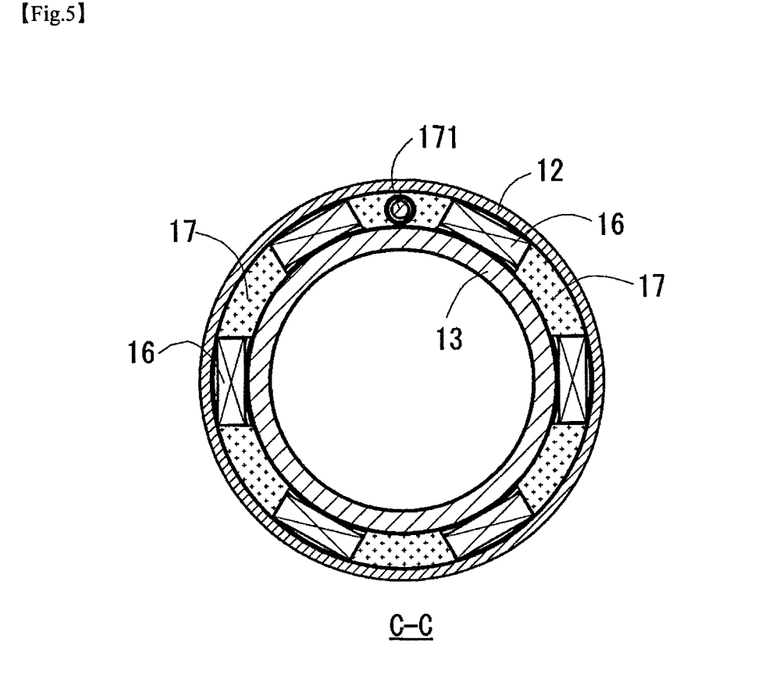
FIG. 5 is a sectional view taken along C-C of FIG. 3 illustrating the arrangement of a pressure detecting element in the combustion pressure sensor according to the first embodiment of this invention.

FIG. 1 is a perspective view showing the appearance of a combustion pressure sensor according to a first embodiment of this invention. FIG. 2 is an exploded perspective view of this combustion pressure sensor. FIG. 3 is a sectional view taken along a cross section A-A of FIG. 1 where an injector as a functional component is shown by phantom lines (alternate long and two short dashes lines). FIG. 4 is a partial sectional view showing a part B of FIG. 3 in an enlarged manner. FIG. 5 is a sectional view taken along a cross section C-C of FIG. 3. In all the drawings, common components are identified by the same numbers and description thereof to overlap among the drawings will not be given repeatedly.

The overall structure of the combustion pressure sensor according to the first embodiment is described below by referring to FIGS. 1 to 5.

As shown in FIG. 1, a combustion pressure sensor 1 according to the first embodiment of this invention has a circular cylindrical shape with an axis X-X as a central axis. The outer appearance of the combustion pressure sensor 1 is such that a support member 11, an external cylindrical member 12, an internal cylindrical member 13, and a diaphragm 14a form a housing, and the support member 11 and a connection terminal 20 to be grounded form an output terminal for a detection signal of combustion pressure. The combustion pressure sensor 1 is attached to a functional component such that the diaphragm 14a faces a combustion chamber.

As shown in FIG. 2, the combustion pressure sensor 1 has a pressure transmitting member 15, a pressure detecting element 16, and a spacer 17 provided inside the housing formed of the support member 11, the external and internal cylindrical members 12 and 13, and the diaphragm 14a.

The support member 11 has a ground electrode 111 electrically continuous with the support member 11, and the connection terminal 20 electrically isolated from the support member 11 and held by the support member 11. The support member 11 forms an output terminal of the combustion pressure sensor 1.

Thus, it is desirable that the support member 11 be made of a conductive material. More specifically, the support member 11, and the external and internal cylindrical members 12 and 13 may be made of stainless steel material having high resistance to heat and conductivity such as SUS630, SUS316, SUS430 according to the JIS, for example.

The ring-shaped pressure transmitting member 15 has an electrode layer described below formed on a surface where the pressure detecting element 16 and the spacer 17 are arranged in a ring pattern.

FIG. 3 shows how the pressure sensor 1 is fitted at the cross section A-A of FIG. 1 to an injector In as a functional component shown by phantom lines (alternate long and two short dashes lines). FIG. 3 shows that the diaphragm 14a is arranged to face a combustion chamber Ec located in the direction of the tip of the injector In.

As shown in FIG. 3, the external and internal cylindrical members 12 and 13 are sealed by laser welding to extend coaxially along one outer circumference and one internal circumference respectively of the support member 11 relative to the X-X axis as a central axis. Likewise, the ring-shaped diaphragm 14a is sealed such that it is laser-welded to the external and internal cylindrical members 12 and 13 to extend along one circumference on a side near the combustion chamber Ec opposite the external and internal cylindrical members 12 and 13, thereby forming circular cylindrical sealed space 19. The ring-shaped pressure transmitting member 15 rectangular in cross section, a ring-shaped electrode layer 18A formed on one surface of the pressure transmitting member 15, and the pressure detecting element 16 are arranged inside the circular cylindrical sealed space 19.

The connection terminal 20 is formed such that it passes through a hole in the spacer 17 and a tip 201 of the connection terminal 20 abuts on the electrode layer 18a to be electrically continuous with the electrode layer 18a on the pressure detecting element 16.

As shown in FIG. 4, the diaphragm 14a has a ring-shaped pressure receiving part 141 on a front surface of the diaphragm 14a to receive combustion pressure from a combustion chamber of the combustion chamber Ec, and a ring-shaped transmitting part 142 on a rear surface of the diaphragm 14a to transmit the received pressure to the pressure transmitting member 15. The pressure receiving part 141 and the transmitting part 142 are formed integrally. The position of the transmitting part 142 of the diaphragm 14a relative to those of the external and internal cylindrical members 12 and 13 is determined such that the transmitting part 142 does not contact both the inner circumferential surface of the external cylindrical member 12 and the outer circumferential surface of the internal cylindrical member 13.

More specifically, a ring thickness is smaller at the transmitting part 142 than at the pressure receiving part 141 and the transmitting part 142 is provided in a substantially central part of the thickness direction of the pressure receiving part 141, thereby forming a T-shape cross section. The ring thickness (thickness direction) of the diaphragm 14a means the thickness of a ring part of the overall shape in the radial direction. The ring width (width direction) of the diaphragm 14a means the width of the ring part of the overall shape in the axial direction. Specifically, the lateral width and the longitudinal width of the aforementioned T-shape correspond to the ring thickness and the ring width respectively. The transmitting part 142 is formed so as to become smaller gradually in the ring thickness from a side near the pressure transmitting member 15 toward a side near the pressure receiving part 141. The pressure receiving part 141 is formed so as to become smaller gradually in the ring width from opposite sides toward the center in the thickness direction thereof. In this case, a pressure receiving surface (front surface) of the pressure receiving part 141 is flat. When the diaphragm 14a is fitted to the external and internal cylindrical members 12 and 13, the opposite sides of the pressure receiving part 141 in the thickness direction are fixed to respective end portions of the external and internal cylindrical members 12 and 13.

In consideration of exposure of the diaphragm 14a in the combustion chamber to be placed in high temperature and high pressure, it is desirable that the diaphragm 14a be made of a material of high elasticity, excellent durability, excellent resistance to heat, and excellent resistance to corrosion such as SUH660, for example.

As described above, the pressure transmitting member 15 and the pressure detecting element 16 are fitted to be interposed between the transmitting part 142 of the diaphragm and the support member 11 in the sealed space 19 defined by the diaphragm 14a, the external and internal cylindrical members 12 and 13, and the support member 11 to make the pressure receiving part 141 of the diaphragm deflect. A resultant compression load makes the pressure transmitting member 15 and the pressure detecting element 16 abut on each other tightly. This allows transmission of combustion pressure received by the diaphragm 14a to the pressure detecting element 16 without loss. The support member 11 tightly abutting on one side of the pressure detecting element 16 receives the pressure by being supported by a rigid body, the injector as a functional component, thereby allowing detection of combustion pressure more accurately.

The pressure detecting element 16 is formed as a rectangular parallelepiped. Multiple pressure detecting elements 16 can be arranged in the circumferential direction between the support member 11 and the pressure transmitting member 15. A stack of highly-conductive metal thin films in multiple layers is formed on each of opposite surfaces of the pressure detecting element 16 tightly abutting on the support member 11 and the pressure transmitting member 15. This forms electrodes each with the stack of the metal thin films in multiple layers.

One of the electrodes of the pressure detecting element 16 tightly abuts on the ground electrode 111 of the support member 11 to be connected to the ground electrode 111. The other electrode tightly abuts on the electrode layer 18a of the pressure transmitting member 15 to be connected to the electrode layer 18a. This allows an output signal from the pressure detecting element 16 to detect combustion pressure to be output from the support member 11 and the connection terminal 20.

It is desirable that the pressure detecting element 16 be made of a single-crystalline material having excellent resistance to heat and spontaneous polarization without a Curie point according to which stable piezoelectric conversion properties are achieved even in a wide temperature range. More specifically, it is desirable that the pressure detecting element 16 be made of a single-crystalline material such as LTG ($La_3Ta_{0.5}Ga_{5.5}O_{14}$), LTGA ($La_3Ta_{0.5}Ga_{4.8}Al_{0.2}O_{14}$), or LGS ($La_3Ga_5SiO_{14}$), or a single-crystalline material such as LNG, LGSA, LNGA, CAAS, or CTGS.

The pressure transmitting member 15 has a ring shape rectangular in cross section. The electrode layer 18a is formed to extend on an entire circumference of a surface of the pressure transmitting member 15 tightly abutting on the pressure detecting element 16. It is desirable that the pressure transmitting member 15 be made of a ceramic material having resistance to heat and insulating properties such as alumina.

The electrode layer 18a of the pressure transmitting member 15 is formed of a highly-conductive metal thin film in one layer or such metal thin films stacked in multiple layers. As an example, it is desirable that a layer to be used as the electrode layer 18a be a stack of joined layers including Ti in an adhesion reinforcing layer, Pt in an anti-diffusion layer, and Au in a top layer. It is also desirable that an alignment adjusting layer including for example Au—Sn for adjustment of the position of the pressure detecting element 16 be formed on the joined layers.

As shown in FIG. 5, the multiple pressure detecting elements 16 as rectangular parallelepipeds and the spacers 17 are arranged alternately on the electrode layer 18a in the circumferential direction of a circular cylinder formed of the external and internal cylindrical members 12 and 13.

The spacers 17 are formed as sections of a ring. It is preferable that the ring thickness of the spacers 17 be substantially the same as the ring thickness of the circular cylinder formed of the external and internal cylindrical members 12 and 13, specifically the ring thickness of the pressure transmitting member 15 and be slightly smaller than the width of the pressure detecting elements 16 (X-axis direction). It is desirable that the spacers 17 be made of a ceramic material having resistance to heat and insulating properties such as alumina. The spacers 17 are formed into a shape of a dimension filling intervals between the pressure detecting elements 16. This assists in adjusting the alignment of the pressure detecting elements 16 to allow the pressure detecting elements 16 to be fit in their positions correctly and easily.

One of the spacers 17 is provided with a hole 171 that allows the connection terminal 20 to pass therethrough. As shown in the right side of the sectional view of FIG. 3, this makes the tip 201 of the connection terminal 20 abut on the electrode layer 18a to be connected to the electrode layer 18a, thereby allowing output of an electric signal from the pressure detecting element 16.

As described above, the combustion pressure sensor 1 is formed into a ring-shaped cylindrical body and can be attached to a tip portion of a functional component in an engine combustion chamber. Thus, an additional through hole becomes unnecessary in the engine combustion chamber. The ring-shaped diaphragm 14a forms a pressure receiving part for combustion pressure. Thus, adhesion of a combustion residue on a surface of the diaphragm 14a causes no effect on the rigidity of the diaphragm 14a. Further, easily processable multiple rectangular parallelepipeds can be provided as the pressure detecting elements 16. This makes it possible to provide a combustion pressure sensor at low cost having good sensitivity and achieving favorable measurement accuracy.

Second Embodiment

Like the first embodiment, a second embodiment is intended for a combustion pressure sensor formed of a ring-shaped cylindrical body that can be attached to a tip portion of a functional component in an engine combustion chamber. The second embodiment differs from the first embodiment only in the structure of a diaphragm and is completely the same as the first embodiment in the other constituting members.

Figure 6:
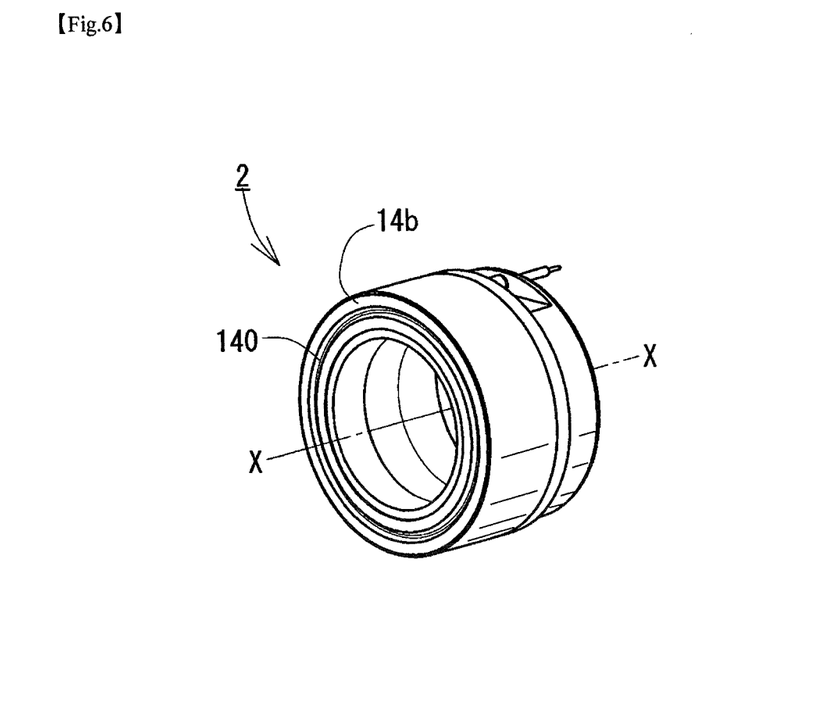
FIG. 6 is a perspective view showing the appearance of a combustion pressure sensor according to a second embodiment of this invention.
Figure 7:
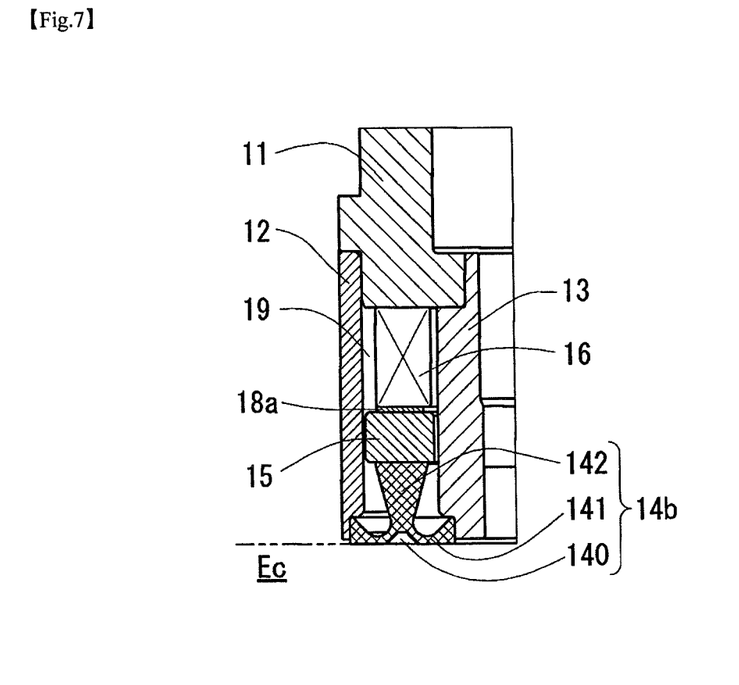
FIG. 7 is a partial sectional view drawn in the same way as FIG. 4 showing the combustion pressure sensor in an enlarged manner according to the second embodiment of this invention.

FIG. 6 is a perspective view showing the appearance of a combustion pressure sensor 2 according to the second embodiment of this invention. FIG. 7 is an enlarged partial sectional view drawn in the same way as FIG. 4. In all the drawings, common components are identified by the same numbers and description thereof to overlap among the drawings will not be given repeatedly.

The overall structure of the combustion pressure sensor according to the second embodiment is described below by referring to FIGS. 6 and 7.

As shown in FIG. 6, like that of the first embodiment, the combustion pressure sensor 2 according to the second embodiment of this invention has a circular cylindrical shape with the axis X-X as a central axis. The combustion pressure sensor 2 differs from that of the first embodiment in that a groove 140 is formed in the central part of the ring thickness of a diaphragm 14b so as to extend along an entire circumference.

As shown in FIG. 7, the diaphragm 14b has the ring-shaped pressure receiving part 141 and the ring-shaped transmitting part 142 formed integrally. In this case, the pressure receiving surface (front surface) of the pressure receiving part 141 is flat and the recessed groove 140 is formed in the central part of the pressure receiving surface in the thickness direction thereof so as to extend along an entire circumference.

Like in the first embodiment, the pressure transmitting member 15 and the pressure detecting element 16 are fitted to be interposed between the transmitting part 142 of the diaphragm and the support member 11 in the sealed space 19 defined by the diaphragm 14b, the external and internal cylindrical members 12 and 13, and the support member 11 to make the diaphragm 14b deflect. A resultant compression load makes the pressure transmitting member 15 and the pressure detecting element 16 abut on each other tightly. This allows transmission of combustion pressure received by the diaphragm 14b to the pressure detecting element 16 without loss.

The diaphragm 14b exposed to a high-temperature fluid in the combustion chamber Ec tries to deform with the heat of the fluid. By the presence of the groove 140, the diaphragm 14b deforms in a direction where the compression load of the diaphragm 14b on the pressure detecting element 16 increases. Specifically, this direction corresponds to a direction where abutting contact becomes tighter between the transmitting part 142 of the diaphragm and the pressure transmitting member 15, between the pressure transmitting member 15 and the pressure detecting element 16, and between the pressure detecting element 16 and the support member 11. This allows accurate measurement of combustion pressure without causing loss in pressure transmission.

Third Embodiment

A third embodiment is intended for a combustion pressure sensor of a structure similar to that of the first embodiment. The third embodiment differs from the first embodiment only in that a part corresponding to the electrode layer is replaced by an electrode member and is completely the same as the first embodiment in the other constituting members.

Figure 8:
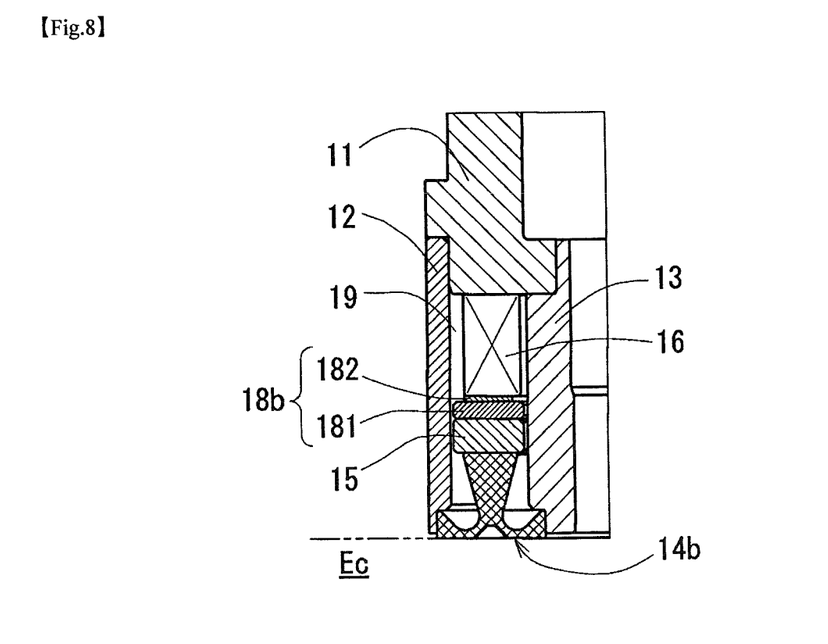
FIG. 8 is a partial sectional view drawn in the same way as FIG. 4 showing a combustion pressure sensor in an enlarged manner according to a third embodiment of this invention.

FIG. 8 is an enlarged partial sectional view drawn in the same way as FIG. 7 of the second embodiment. In all the drawings, common components are identified by the same numbers and description thereof to overlap among the drawings will not be given repeatedly.

The overall structure of the combustion pressure sensor according to the third embodiment is described below by referring to FIG. 8.

As shown in FIG. 8, the difference from the second embodiment is that the electrode layer 18a is replaced by an electrode member 18b. The electrode member 18b is formed of an insulating part 181 and an electrode 182 formed on one surface of the insulating part 181. As an example, the electrode member 18b is an FPC (flexible printed circuits) formed of a polyimide-based film as the insulating part 181 and gold-plated copper foil as the electrode 182.

The pressure transmitting member 15 is electrically isolated from the pressure detecting element 16 with the electrode member 18b. Thus, the pressure transmitting member 15 can be made of a conductive material that may be a SUS material cheaper than ceramic as an insulating material. The pressure transmitting member 15 may be made of the same material as the support member 11 with conductive properties. Further, the pressure transmitting member 15 may be formed integrally with the transmitting part 142 of a diaphragm.

Thus, using the electrode member 18b makes the step of forming the electrode layer 18a on the hard-to-process pressure transmitting member 15 unnecessary, thereby achieving further cost reduction.

Fourth Embodiment

A fourth embodiment differs from the first embodiment in that the single pressure detecting element 16 is arranged instead of multiple pressure detecting elements 16 and is completely the same as the first embodiment in the other constituting members.

Figure 9:
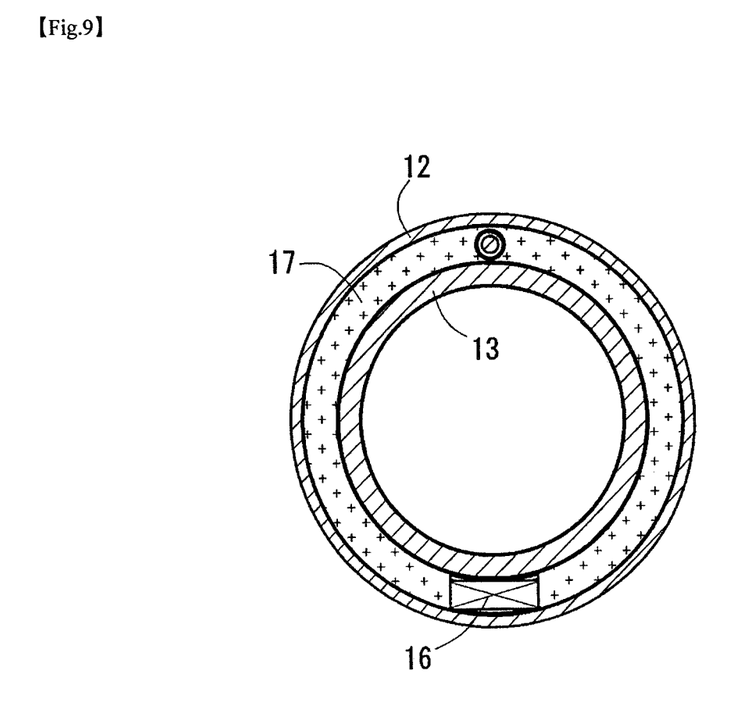
FIG. 9 is a sectional view drawn in the same way as FIG. 5 illustrating the arrangement of a pressure detecting element in a combustion pressure sensor according to a fourth embodiment of this invention.

FIG. 9 illustrates the arrangement of a pressure detecting element in a combustion pressure sensor according to the fourth embodiment of this invention. Like FIG. 5 of the first embodiment, FIG. 9 is a sectional view showing the arrangement of the pressure detecting element 16 and the spacer 17. In all the drawings, common components are identified by the same numbers and description thereof to overlap among the drawings will not be given repeatedly.

The overall structure of the combustion pressure sensor according to the fourth embodiment is described below by referring to FIG. 9.

As shown in FIG. 9, regarding the pressure detecting element 16 on an electrode layer of a pressure transmitting member, the single pressure detecting element 16 as a rectangular parallelepiped and the spacer 17 formed into a C-shape are arranged in circular cylindrical sealed space 5 defined by the external and internal cylindrical members 12 and 13.

Even in the combustion pressure sensor with the single pressure detecting element 16, a compression load is applied from a diaphragm in order to transmit pressure to the pressure detecting element 16 without loss. Thus, using the spacer 17 to keep stress balance is still essential for avoiding an unbalanced load. To adjust the arrangement of the pressure detecting element 16 easily, it is desirable that the spacer 17 be formed into a C-shape.

Specifically, even with the single pressure detecting element 16, using the spacer 17 still allows the pressure detecting element 16 to be fit in its position correctly and easily. Keeping stress balance avoids the occurrence of a crack or a fracture in the pressure detecting element 16. Reducing the number of the pressure detecting elements 16 achieves cost reduction.

This invention is not limited to the embodiments described above in detail. Any change, addition, or deletion is applicable to the structures, shapes, materials, the numbers of the specific parts and the like within a range that does not go out of the spirit of this invention. As an example, a functional component to which the combustion pressure sensor is to be attached may be a spark plug instead of an injector. Further, the electrode member may be a PWB (printed wiring board) instead of an FPC. The aforementioned embodiments of the combustion pressure sensor are not intended for limitation and all of the embodiments are not required to be implemented. The embodiments can be changed or omitted in various ways within the range of the scope of each of the claims.

INDUSTRIAL APPLICABILITY

The combustion pressure sensor according to this invention can be used for measuring pressure in a combustion chamber of an engine, particularly can be used for detecting combustion pressure by being attached to an outer periphery of a tip of a spark plug or an injector, for example.

The invention claimed is:

1. A combustion pressure sensor formed of a ring-shaped cylindrical body, the combustion pressure sensor detecting combustion pressure in a combustion chamber of an engine by being attached to an outer periphery of a tip of a functional component attached to the combustion chamber, comprising:
the ring-shaped cylindrical body forming a sealed space sealed with a ring-shaped diaphragm on one side and with a ring-shaped support member on an opposite side, the sealed space being defined by an external cylindrical member and an internal cylindrical member coaxial with respect to each other,
the ring-shaped diaphragm having a ring-shaped pressure receiving part formed on a side closest to the combustion chamber to receive pressure from outside and a ring-shaped transmitting part formed on a rear surface of the ring-shaped diaphragm,
a pressure transmitting member and a pressure detecting element being provided in the sealed space, and
abutting contact being formed between the ring-shaped transmitting part of the ring-shaped diaphragm and the pressure transmitting member, between the pressure transmitting member and the pressure detecting element, and between the pressure detecting element and the ring-shaped support member,
wherein opposite sides of an end of the ring-shaped pressure receiving part on the side closest to the combustion chamber includes an external end portion and an internal end portion of the ring-shaped pressure receiving part wherein the external end portion of the ring-shaped pressure receiving part is fixed to an internal peripheral end portion of the external cylindrical member and the internal end portion is fixed to an external peripheral end portion of the internal cylindrical member,
wherein:
at least any one of that the external cylindrical member has a distal end with an annular recess formed on the internal peripheral end portion and that the internal cylindrical member has a distal end with an annular recess formed on the external peripheral end portion,
at least any one of that the external end portion of the ring-shaped pressure receiving part is fixed to the annular recess formed on the internal peripheral end portion of the external cylindrical member and that the internal end portion of the ring-shaped pressure receiving part is fixed to the annular recess formed on the external peripheral end portion of the internal cylindrical member, and
the ring-shaped pressure receiving part extends from the distal end of the external end portion and the distal end of the internal end portion.

2. The combustion pressure sensor according to claim 1, wherein the ring-shaped transmitting part and the ring-shaped pressure receiving part are formed integrally, a ring thickness is smaller at the ring-shaped transmitting part than at the ring-shaped pressure receiving part, and the ring-shaped transmitting part is provided in a central part of a thickness direction of the ring-shaped pressure receiving part, thereby forming a T-shape cross section.

3. The combustion pressure sensor according to claim 1, wherein the ring-shaped transmitting part is formed so as to become smaller gradually in a ring thickness relative to the ring thickness adjacent to the pressure transmitting member as the ring-shaped transmitting part extends from a side near the pressure transmitting member toward a side near the ring-shaped pressure receiving part.

4. The combustion pressure sensor according to claim 1, wherein the ring-shaped pressure receiving part is formed so as to become smaller gradually in a ring width from opposite sides toward a center in a thickness direction thereof.

5. The combustion pressure sensor according to claim 1, wherein opposite sides of the ring-shaped pressure receiving part in a thickness direction thereof are fixed to an end portion of the external cylindrical member and an end portion of the internal cylindrical member.

6. The combustion pressure sensor according to claim 1, wherein the ring-shaped pressure receiving part has a flat pressure receiving surface.

7. The combustion pressure sensor according to claim 1, wherein the ring-shaped pressure receiving part has a flat pressure receiving surface and a groove is formed in a central part of the pressure receiving surface in a thickness direction thereof so as to extend along an entire circumference.

8. The combustion pressure sensor according to claim 1, wherein the pressure detecting element includes a plurality of pressure detecting elements that are each formed as a rectangular parallelepiped and the pressure detecting elements are arranged at an interval in a circumferential direction of the sealed space.

9. The combustion pressure sensor according to claim 8, wherein a spacer is arranged in the interval between the pressure detecting elements.

10. The combustion pressure sensor according to claim 2, wherein the ring-shaped transmitting part is formed so as to become smaller gradually in the ring thickness from a side near the pressure transmitting member toward a side near the ring-shaped pressure receiving part.

11. The combustion pressure sensor according to claim 2, wherein the ring-shaped pressure receiving part is formed so as to become smaller gradually in a ring width from opposite sides toward the center in a thickness direction thereof.

12. The combustion pressure sensor according to claim 3, wherein the ring-shaped pressure receiving part is formed so as to become smaller gradually in a ring width from opposite sides toward the center in a thickness direction thereof.

13. The combustion pressure sensor according to claim 2, wherein opposite sides of the ring-shaped pressure receiving part in a thickness direction thereof are fixed to an end portion of the external cylindrical member and an end portion of the internal cylindrical member.

14. The combustion pressure sensor according to claim 3, wherein opposite sides of the ring-shaped pressure receiving part in a thickness direction thereof are fixed to an end portion of the external cylindrical member and an end portion of the internal cylindrical member.

15. The combustion pressure sensor according to claim 2, wherein the ring-shaped pressure receiving part has a flat pressure receiving surface.

16. The combustion pressure sensor according to claim 3, wherein the ring-shaped pressure receiving part has a flat pressure receiving surface.

17. The combustion pressure sensor according to claim 4, wherein the ring-shaped pressure receiving part has a flat pressure receiving surface.

18. The combustion pressure sensor according to claim 1, wherein the external cylindrical member has the annular recess.

19. The combustion pressure sensor according to claim 1, wherein the internal cylindrical member has the annular recess.

20. The combustion pressure sensor according to claim 1, wherein the external cylindrical member and the internal cylindrical member have the annular recess.

* * * * *